(12) United States Patent
Steigerwald

(10) Patent No.: US 7,036,189 B2
(45) Date of Patent: May 2, 2006

(54) FASTENING MEANS WITH AT LEAST ONE FLEXIBLE TENSION STRAND

(75) Inventor: Thomas C. Steigerwald, Rochester Hill, MI (US)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 10/454,977

(22) Filed: Jun. 5, 2003

(65) Prior Publication Data

US 2003/0226245 A1    Dec. 11, 2003

Related U.S. Application Data

(60) Provisional application No. 60/387,242, filed on Jun. 7, 2002.

(51) Int. Cl.
*A44B 21/00* (2006.01)

(52) U.S. Cl. ..................... 24/300; 24/265 H

(58) Field of Classification Search .......... 24/298–302, 24/265 H, 698.3; 410/97; 248/499
See application file for complete search history.

(56) References Cited

U.S. PATENT DOCUMENTS

| | | | | |
|---|---|---|---|---|
| 252,832 A | * | 1/1882 | Bernd | 24/600.9 |
| 1,686,424 A | * | 10/1928 | Thomson et al. | 24/136 R |
| 5,722,125 A | * | 3/1998 | Vasilopoulos | 24/301 |
| 5,797,167 A | * | 8/1998 | Schwab | 24/16 R |

* cited by examiner

*Primary Examiner*—James R. Brittain
(74) *Attorney, Agent, or Firm*—Flynn, Thiel, Boutell & Tanis, P.C.

(57) ABSTRACT

A fastening means with at least one flexible tension strand, which has a hook element at each of its two opposite ends, where it is provided in accordance with the invention that each end of the minimum of one tension strand is attached to a seating element, on which a hook element is supported with freedom to rotate around its longitudinal center axis. The invention is suitable in particular for the securing of objects in the interior space of passenger vehicles.

5 Claims, 4 Drawing Sheets

FASTENING MEANS WITH AT LEAST ONE FLEXIBLE TENSION STRAND

This application claims priority under 35 U.S.C. 119(e) of the filing date of U.S. Ser. No. 60/387,242, filed Jun. 7, 2002.

BACKGROUND OF THE INVENTION

1. The Technical Field

The invention pertains to a fastening means with at least one flexible tension strand, which has a hook element at each of its two opposite ends.

2. The Prior Art

A fastening means of this type is known generally as a tension element. A tension element of this type has an elastically resilient tension strand, to each of the two opposite ends of which a hook element is permanently connected. The tension element is used to hold objects in place, for example, on the luggage carriers of bicycles, where the corresponding tension element is stretched over the object to be held in place and is attached firmly at opposite ends by its hook elements to the luggage carrier.

The task of the invention is to create a fastening means of the type indicated above which can be put to various uses.

SUMMARY OF THE INVENTION

This task is accomplished in that each end of the minimum of one tension strand is attached to a seating element such as a hook or bar, on each of which a hook element is supported with freedom to rotate around its longitudinal center axis. As a result, it is possible for the hook elements to be hooked in various positions without subjecting the tension strand to torsion, that is, without twisting. Because of its rotational support according to the invention, the hook element is disengaged from any torsional loads which the associated tension strand might otherwise impose on it.

The task on which the invention is based is also accomplished in that at least two tension strands are attached, in a bundle, by their ends to a collective seating element such as a hook or bar, and in that the opposite ends of these strands are provided with a corresponding number of independent hook elements.

According to the invention, several objects can be secured independently of each other by separate tension strands and hook elements. At the same time, however, the collective seating element such as a hook or bar, which is attached to a suitable fixed point, defines a single, common attachment point for all these objects. This solution is especially advantageous for applications of the fastening means in motor vehicles, in which various types of shopping bags or other objects are to be secured.

In an embodiment of the invention, the tension strand, of which there is at least one, is designed to be elastically resilient. This embodiment offers the advantage that it is thus possible to hold and secure objects of different sizes and weights. In particular, it is possible to secure shopping bags of different sizes in their upright position in a motor vehicle by engaging the hook elements in the handles of the shopping bags. The shopping bags can advantageously also be supported from underneath on an appropriate interior surface of the motor vehicle, so that the tension strands do not have to support the entire weight of the object to be secured. The various tension strands are also advantageously designed with different lengths when in their unloaded rest position. As a result, the range of uses to which they can be put becomes even wider.

In a further embodiment of the invention, each seating element which may also be called an attachment point is supported with freedom of rotation with respect to its longitudinal center axis around an attachment point for the end of the tension strand. The associated hook element is preferably supported with freedom of rotation on the seating element. Because the seating element itself is also supported with freedom or rotation relative to the associated tension strand, the degree to which the hook elements and seating elements are disengaged from the load of the tension strands is improved even more.

In a further embodiment of the invention, a hook element provided with a release guard is attached to the collective seating element or attachment point. The release guard prevents the hook element from becoming accidentally unhooked from its point of attachment. This is advantageous especially in normal motor vehicle driving situations, because sideways rocking motions and accelerations and decelerations of the vehicle can result in increased forces at the point of attachment between the collective seating element and the fixed holder in the interior of the vehicle. When these types of loads occur, the release guard reliably prevents the hook element from becoming accidentally unhooked. In particular, an elastically resilient guard hoop or similarly designed, preferably elastically resilient, guard projection can be provided, which temporarily blocks off the receiving area for hooking and unhooking the hook element.

Additional advantages and features of the invention can be derived from the claims and from the following description of a preferred exemplary embodiment of the invention, which is illustrated on the basis of the figures.

DETAILED DESCRIPTION OF THE INVENTION

Figure 1:
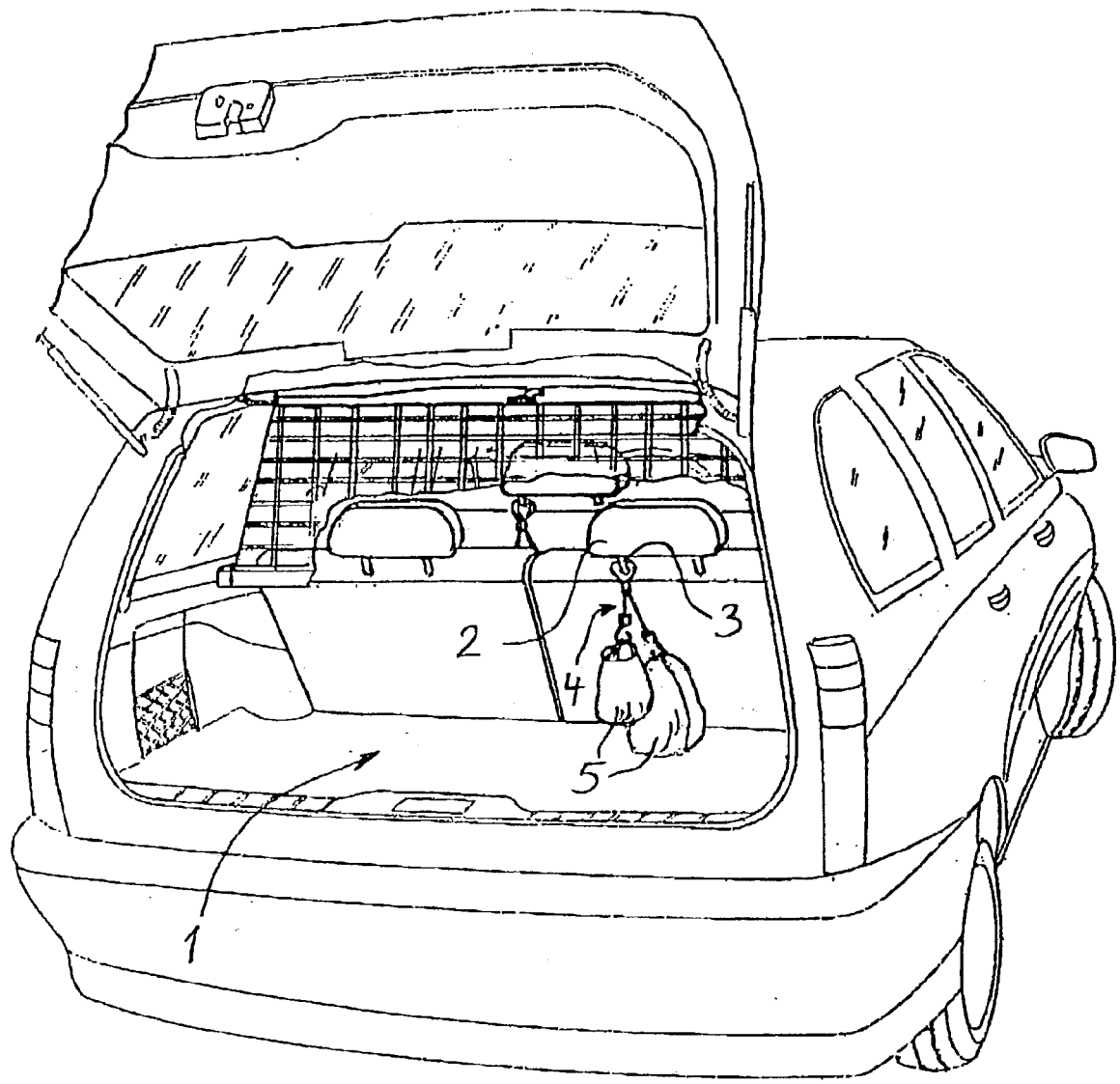
FIG. 1 shows a perspective view of an embodiment of a fastening means according to the invention in its working position in the trunk of station wagon.

While this invention is susceptible of embodiment in many different forms, there is shown in the drawings and will be described in detail several specific embodiments, with the understanding that the present disclosure is to be considered an exemplification of the principles of the invention and is not intended to limit the invention to the embodiments illustrated.

Figure 2:
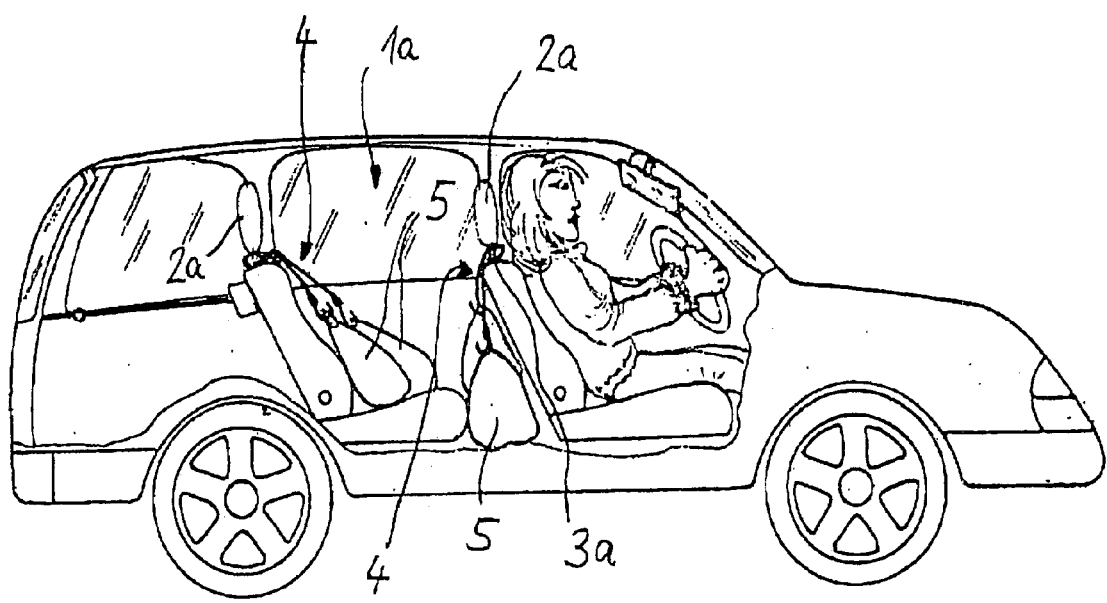
FIG. 2 shows a station wagon similar to that of FIG. 1 with several fastening means according to FIG. 1 distributed around the interior of the vehicle.
Figure 3:
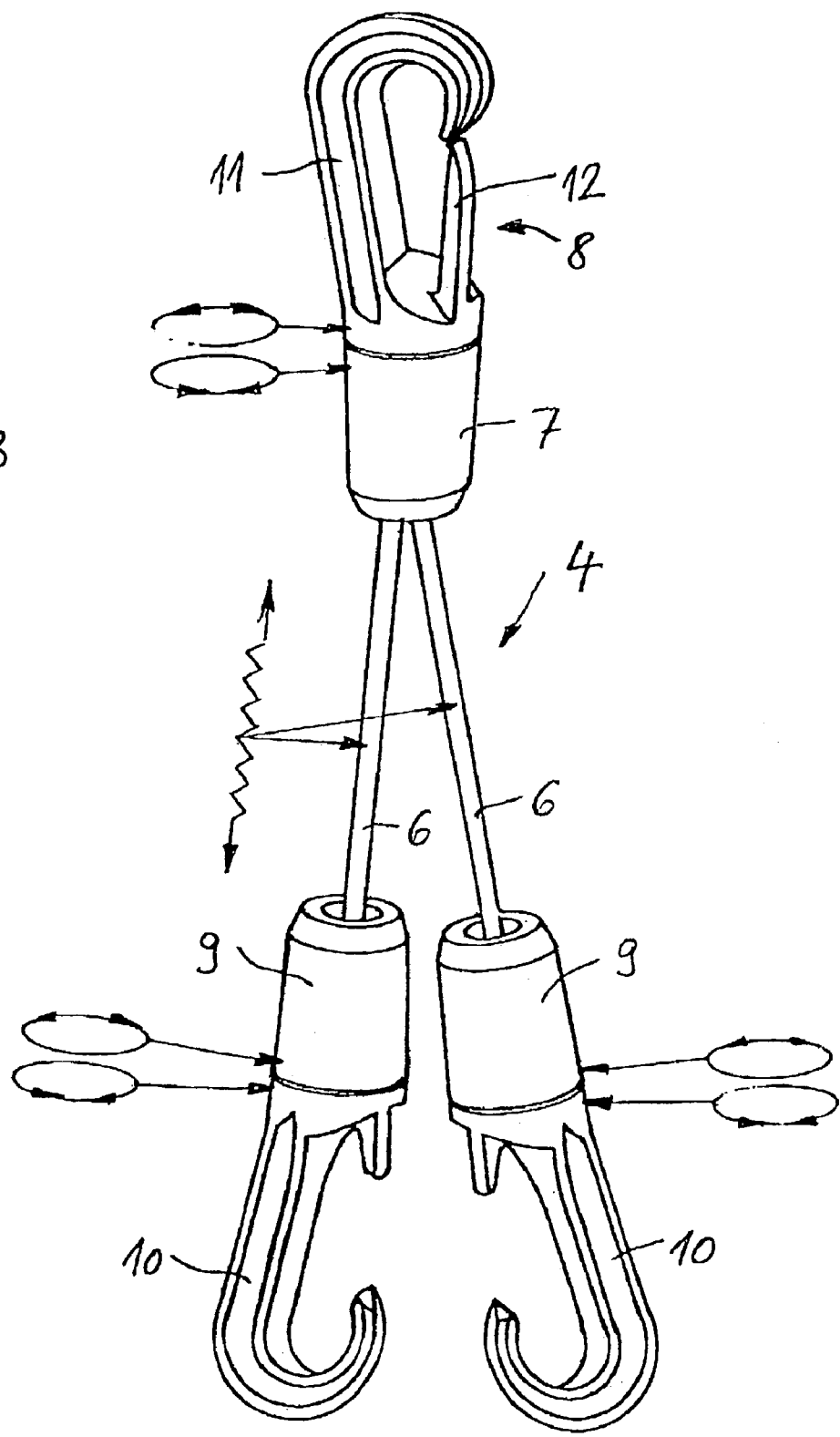
FIG. 3 shows an enlarged, perspective view of a fastening means such as that used in FIGS. 1 and 2.
Figure 4:
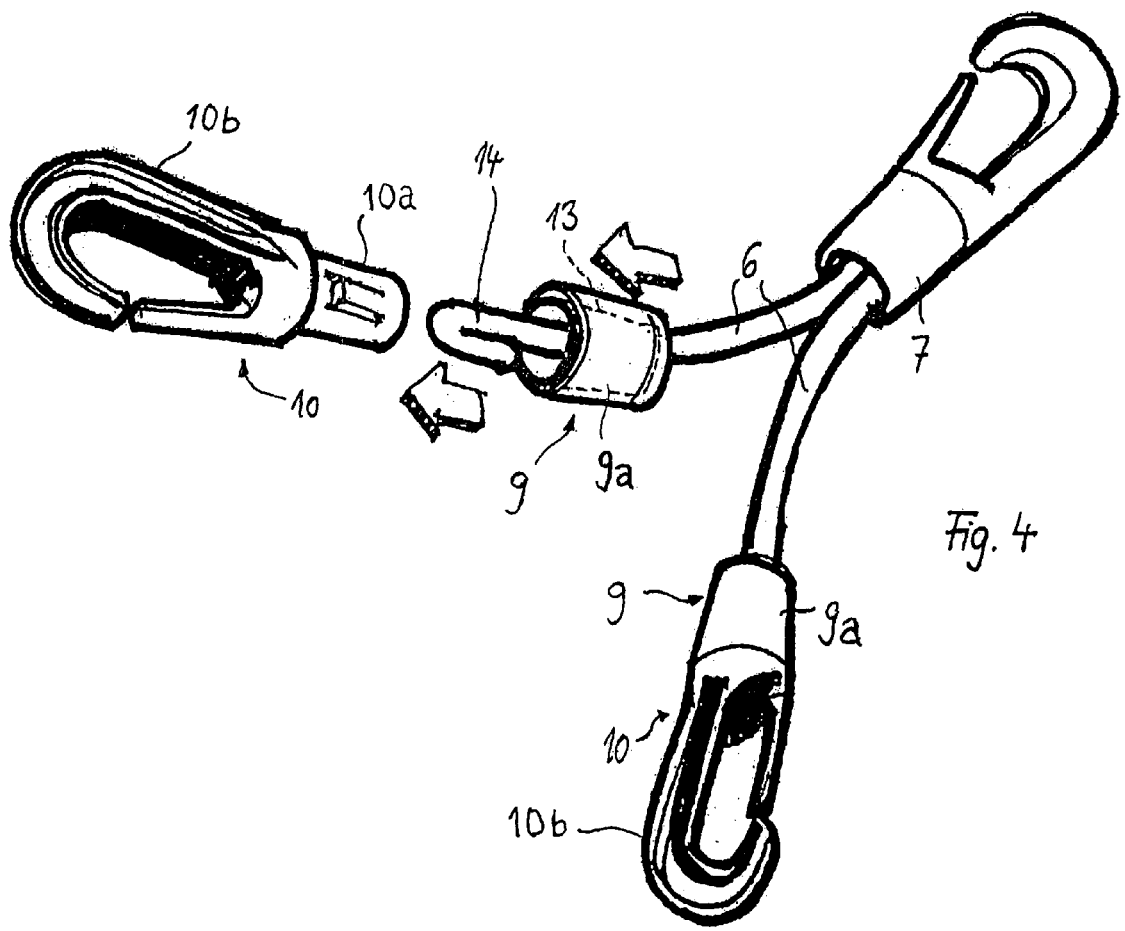
FIG. 4 shows an exploded, perspective view of the fastening means according to FIG. 3.

A motor vehicle in the form of a station wagon according to FIGS. 1 and 2 has an interior space 1, 1a. The interior space 1, 1a of the vehicle has a seat unit in the front and a seat unit in the rear. Behind the rear seat unit is a cargo space. The seat units have backrests, on the tops of which headrests 2, 2a are provided. The headrests 2, 2a are attached by sliding frames 3, 3a to the backrests of the seat units. These sliding frames 3, 3a of the headrests 2, 2a serve as preferred attachment or holding points, in a fixed position in the vehicle, for the fastening means 4, described in greater detail below. The fastening means 4 shown in FIGS. 1 and 2 are designed as illustrated in FIGS. 3 and 4. Accordingly, a fastening means with two tension strands 6 of elastically resilient material is provided. The elastic resilience of the two tension strands 6 is illustrated by the symbolic spring in FIG. 3. The two tension strands 6 terminate in cup-like seating elements 9. The end parts of the tension strands 6 are preferably provided with areas 14 of greater thickness, which are anchored in their associated seating elements 9 in a form-locking manner with respect to the tension direction of the tension strands 6. As can be seen on the basis of the arrows in FIG. 3, the seating elements 9 are supported in such a way that they can rotate around their center longitudinal axis and thus also around corresponding nodal points at the ends of the tension strands 6. As shown in FIG. 4, the seating elements 9 have for this purpose a core 13, in which the folded-back ends, that is, the areas 14 of greater thickness, of the tension strands 6, are held and anchored. This core 13 is not free to rotate relative to the thickened areas 14 of the tension strands 6. The core is enclosed in each case by a cup-shaped sleeve 9a, visible in FIGS. 3 and 4, of a seating element 9, which jackets the core 13 and is supported with the freedom to rotate relative to the core. The sleeve 9a of the seating element 9, i.e., of the core 13, is connected by latching means 10a to the associated hook element 10. To ensure that the hook element is free to rotate, it is preferably also made of two parts. That is, it can consist of a latching part 10a, which can be latched to the core 13, and the hook part 10b of the hook element 10, which is supported with freedom of rotation on the latching part 10a.

An upper seating element in FIG. 3, at which both of the tension strands 6 terminate, represents a collective seating element 7. This element is designed in the same way as the previously described seating elements 9, each of which receives the end of only a single tension strand. The only difference is that, in this case, the ends of two tension strands 6 are anchored jointly in this collective seating element 7, that is, in the corresponding core.

A hook element 11, which projects out from the side opposite the tension strands 6, is provided on the collective seating element 7. A hook element 10 is mounted in the same way on each of the seating elements 9; these hooks also project out from the side of the seating element opposite the associated tension strand 6. The hook elements 10, 11 are supported with freedom of coaxial rotation around the longitudinal center axes of the seating elements 9 and around that of the collective seating element 7, respectively. For this purpose, the hook elements 10, 11 are supported rotatably either on the associated core or on the cup-shaped sleeve of each of the receiving elements or of the collective receiving element 7. This is illustrated by the circular arrows.

In an exemplary embodiment of the invention not illustrated here, the hook elements 10, 11 are connected nonrotatably to the associated rotatable seating elements. In this embodiment, therefore, the seating elements and the hook elements always rotate together in dependence on each other.

A release guard 8 is assigned to the hook element 11, which is supported rotatably on the collective seating element 7; this release guard blocks off the open area of the hook element 11 used for hooking and unhooking. An elastically resilient tab or web-like projection 12 is provided as a release guard, which, when in its unloaded rest position according to FIG. 3, blocks off the open area of the hook element. As the hook element 11 is being hooked onto an appropriate attachment point fixed to the vehicle, the projection 12 is pushed back toward the hook element 11 under elastic deformation until the hooking process is complete. Upon completion of the hooking process, the projection 12 springs back to its original position. To unhook the hook, the projection is pushed back by hand, which allows the hook element 11 to be removed.

So that typical shopping bags 5 or other objects can be secured within the interior of the vehicle 1, 1a, each fastening means 4 is first hooked to the vehicle by the hook element 11 assigned to the collective seating element 7. In the illustrations according to FIGS. 1 and 2, the fastening means is hooked to the sliding frames 3 of the front and rear seat units. It is now possible, as needed, to hook the handles of typical shopping bags 5 onto the free-hanging hook elements 10 of the lower seating elements 9. If a shopping bag is relatively heavy because of its contents, the tension strand 6 in question will stretch elastically downward until the shopping bag 6 comes to rest on a corresponding support surface in the interior space of the vehicle. According to FIGS. 1 and 2, such support surfaces are in particular the floor of the cargo space (FIG. 1), the surface of the seat cushion of the rear seat unit, and the floor of the interior of the vehicle immediately behind the front seats. If the shopping bags or objects in question are relatively light in weight, they will hang freely from the tension strands 6 in question and can also lean against an upright surface of the vehicle's interior as well, depending on their orientation inside the vehicle.

The foregoing description and drawings merely explain and illustrate the invention, and the invention is not limited thereto, except as those skilled in the art who have the present disclosure before them will be able to make modifications and variations therein without departing from the scope of the invention.

What is claimed is:
1. A fastening apparatus, comprising:
a first fastener having a collective seating element and a first hook element;
at least two flexible tension strands, each having opposed first and second ends, each of the at least two flexible tension strands having the first end affixed to the collective seating element, so that the at least two flexible tension strands are attached, in a bundle, to the collective seating element; and each of the second ends of the at least two flexible tension strands having a single, separate, second fastener affixed thereto, so that there is one second fastener provided for each of the at least two flexible tension strands, each separate, second fastener having a longitudinal center axis, a second seating element and a second hook element, the second seating element having a core at which the second fastener is affixed to the second end of the respective one of the at least two flexible tension strands, and having a cup-shaped sleeve that encloses the core and is free to rotate about the longitudinal center axis with respect to the core and the affixed second end of the respective one of the at least two flexible tension strands, the second hook element having a latching part connecting the second hook element to the sleeve;

each of the second hook elements being configured for free rotation about its respective longitudinal center axis, relative to the affixed second end of the respective one of the at least two flexible tension strands.

2. The fastening apparatus according to claim 1, wherein the first fastener has a longitudinal axis, wherein the collective seating element has a collective core, at which the collective seating element is affixed to the first ends of the at least two flexible tension strands, and has a cup-shaped collective sleeve that encloses the collective core and is free to rotate about the longitudinal axis with respect to the collective core and the affixed first ends of the at least two flexible tension strands, and wherein the first hook element has a latching part connecting the first hook element to the collective sleeve.

3. The fastening apparatus according to claim 1, wherein the first fastener has a longitudinal axis, and wherein the first hook element is configured for free rotation about the longitudinal axis, relative to the affixed first ends of the at least two flexible tension strands.

4. The fastening apparatus according to claim 1, characterized in that each of the at least two flexible tension strands is elastically resilient.

5. The fastening apparatus according to claim 1, characterized in that each of the first and second hook elements comprises a resilient release guard.

* * * * *